US009354791B2

(12) United States Patent
Beaurepaire

(10) Patent No.: US 9,354,791 B2
(45) Date of Patent: May 31, 2016

(54) APPARATUS, METHODS AND COMPUTER PROGRAMS FOR DISPLAYING IMAGES

(71) Applicant: HERE Global B.V., LB Veldhoven (NL)

(72) Inventor: Jerome Beaurepaire, Berlin (DE)

(73) Assignee: HERE Global B.V., Le Veldhoven (NL)

( * ) Notice: Subject to any disclaimer, the term of this patent is extended or adjusted under 35 U.S.C. 154(b) by 231 days.

(21) Appl. No.: 13/922,910

(22) Filed: Jun. 20, 2013

(65) Prior Publication Data
US 2014/0380216 A1 Dec. 25, 2014

(51) Int. Cl.
*G06F 3/048* (2013.01)
*G06F 3/0484* (2013.01)
*G06F 17/30* (2006.01)
*G06F 3/0488* (2013.01)

(52) U.S. Cl.
CPC ........ *G06F 3/04842* (2013.01); *G06F 3/04845* (2013.01); *G06F 3/04886* (2013.01); *G06F 17/3087* (2013.01); *G06F 17/30241* (2013.01); *G06F 17/30244* (2013.01); *G06F 17/30247* (2013.01); *G06F 17/30265* (2013.01)

(58) Field of Classification Search
None
See application file for complete search history.

(56) References Cited

U.S. PATENT DOCUMENTS

| 2009/0319175 | A1* | 12/2009 | Khosravy et al. | 701/206 |
| 2011/0122244 | A1* | 5/2011 | Cho | 348/113 |
| 2011/0141141 | A1 | 6/2011 | Kankainen et al. | |
| 2011/0254915 | A1 | 10/2011 | Vicent et al. | |
| 2011/0279446 | A1 | 11/2011 | Castro et al. | |
| 2011/0283223 | A1 | 11/2011 | Vaittinen et al. | |
| 2011/0302527 | A1* | 12/2011 | Chen | G06F 3/0488 715/800 |
| 2012/0105476 | A1 | 5/2012 | Tseng et al. | |
| 2012/0216149 | A1 | 8/2012 | Kang et al. | |
| 2013/0191787 | A1* | 7/2013 | Armstrong | G06F 3/04815 715/850 |
| 2013/0326425 | A1* | 12/2013 | Forstall | G01C 21/3638 715/851 |
| 2014/0002439 | A1* | 1/2014 | Lynch | G09B 29/007 345/419 |
| 2014/0006966 | A1* | 1/2014 | Geraci | G06Q 30/0259 715/748 |
| 2014/0297575 | A1* | 10/2014 | Rapoport | G06F 17/30241 706/46 |

OTHER PUBLICATIONS

International Search Report and Written Opinion received for corresponding Patent Cooperation Treaty Application No. PCT/EP2014/061928, dated Sep. 12, 2014, 10 pages.
"HomeSpotter—Augmented Reality Apps in RealEstate, by MobileRealtyApps.com", Vimeo, Retrieved on Oct. 20, 2014, Webpage available at : http://vimeo.com/31953529.
"Museum of London Releases Augmented Reality App for Historical Photos", Peta Pixel, Retrieved on Oct. 17, 2014, Webpage available at : http://petapixel.com/2010/05/24/museum-of-london-releases-augmented-reality-app-for-historical-photos/.
"Fraunhofer stellt "Augmented Reality" für Mobiltelefone Vor", Heise Online, Retrieved on Oct. 17, 2014, Webpage available at : http://www.heise.de/newsticker/meldung/Fraunhofer-stellt-Augmented-Reality-fuer-Mobiltelefone-vor-201335.html.

(Continued)

*Primary Examiner* — Stephen Alvesteffer
(74) *Attorney, Agent, or Firm* — Alston & Bird LLP

(57) ABSTRACT

Methods provided herein are directed toward presenting images, and more specifically, to presenting images through the removal of obstructions. Methods may include causing display of an image of a first scene at a first position, the first scene including at least one object; causing detection of a selection event; and in response to detection of the selection event, causing display of a pre-recorded image of a second scene recorded at a second position, where the at least one object is between the first position and the second position.

18 Claims, 13 Drawing Sheets

(56) References Cited

OTHER PUBLICATIONS

Figure 1:
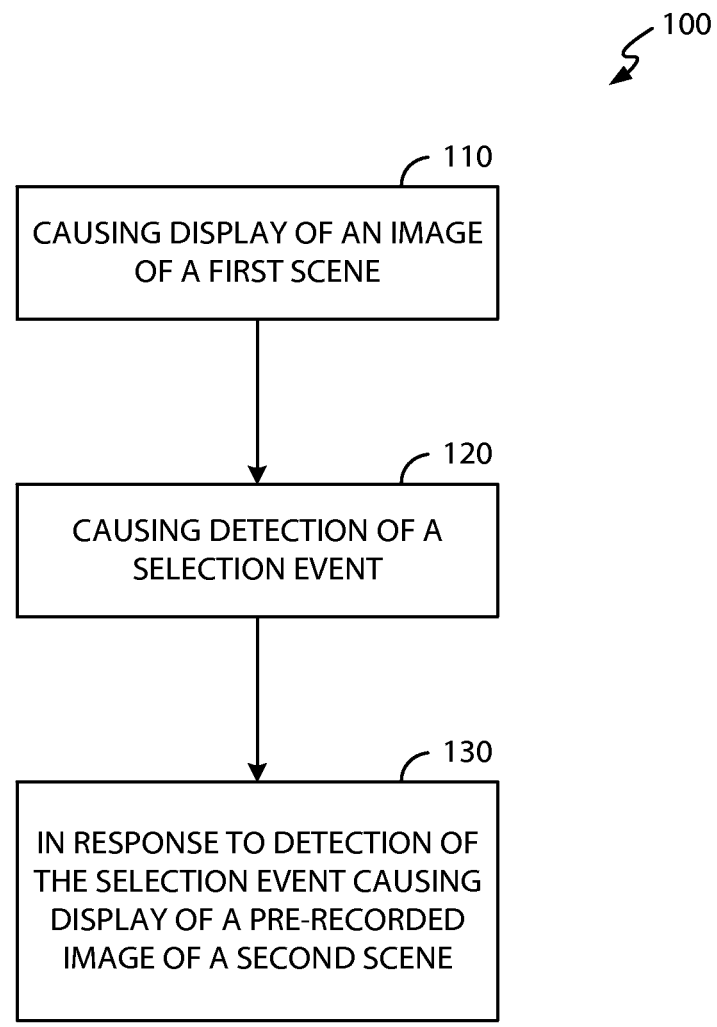

"Mobile Augmented Reality—Reality, Improved", The Economist, Retrieved on Oct. 17, 2014, Webpage available at : http://www.economist.com/node/14299602.

Johannes Kopf et al. "Street Slide Browsing Street Level Imagery", Microsoft Research, Mar. 19, 2013.

Jason Cipriani, "Getting to know Google Maps on iOS-Google Maps has arrived on iOS (again). Here's what you need to know how to get started with the revamped Google Maps on your iPhone", Dec. 13, 2012.

* cited by examiner

US 9,354,791 B2

APPARATUS, METHODS AND COMPUTER PROGRAMS FOR DISPLAYING IMAGES

TECHNOLOGICAL FIELD

Embodiments of the present invention relate to apparatus, methods and computer programs for displaying images.

BACKGROUND

It is now common for members of the public to own apparatus capable of displaying images. These apparatus may be, for example, mobile electronic devices such as mobile telephones, personal media players and so on.

It would be desirable to allow a user of such an apparatus to easily control the display of images by the apparatus.

BRIEF SUMMARY

According to various, but not necessarily all, embodiments of the invention there is provided an apparatus comprising: at least one processor; and at least one memory including computer program code the at least one memory and the computer program code configured to, with the at least one processor, cause the apparatus at least to perform: causing display of an image of a first scene at a first position, the first scene comprising at least one object; causing detection of a selection event; and in response to detection of the selection event, causing display of a pre-recorded image of a second scene recorded at a second position, wherein the at least one object is between the first position and the second position.

According to various, but not necessarily all, embodiments of the invention there is provided a method comprising: causing display of an image of a first scene at a first position, the first scene comprising at least one object; causing detection of a selection event; and in response to detection of the selection event, causing display of a pre-recorded image of a second scene recorded at a second position, wherein the at least one object is between the first position and the second position.

A computer program that, when run on a computer, enables performance of: causing display of an image of a first scene at a first position, the first scene comprising at least one object; causing detection of a selection event; and in response to detection of the selection event, causing display of a pre-recorded image of a second scene recorded at a second position, wherein the at least one object is between the first position and the second position.

An apparatus comprising: means for causing display of an image of a first scene at a first position, the first scene comprising at least one object; means for causing detection of a selection event; and means for, in response to detection of the selection event, causing display of a pre-recorded image of a second scene recorded at a second position, wherein the at least one object is between the first position and the second position.

BRIEF DESCRIPTION

Figure 2:
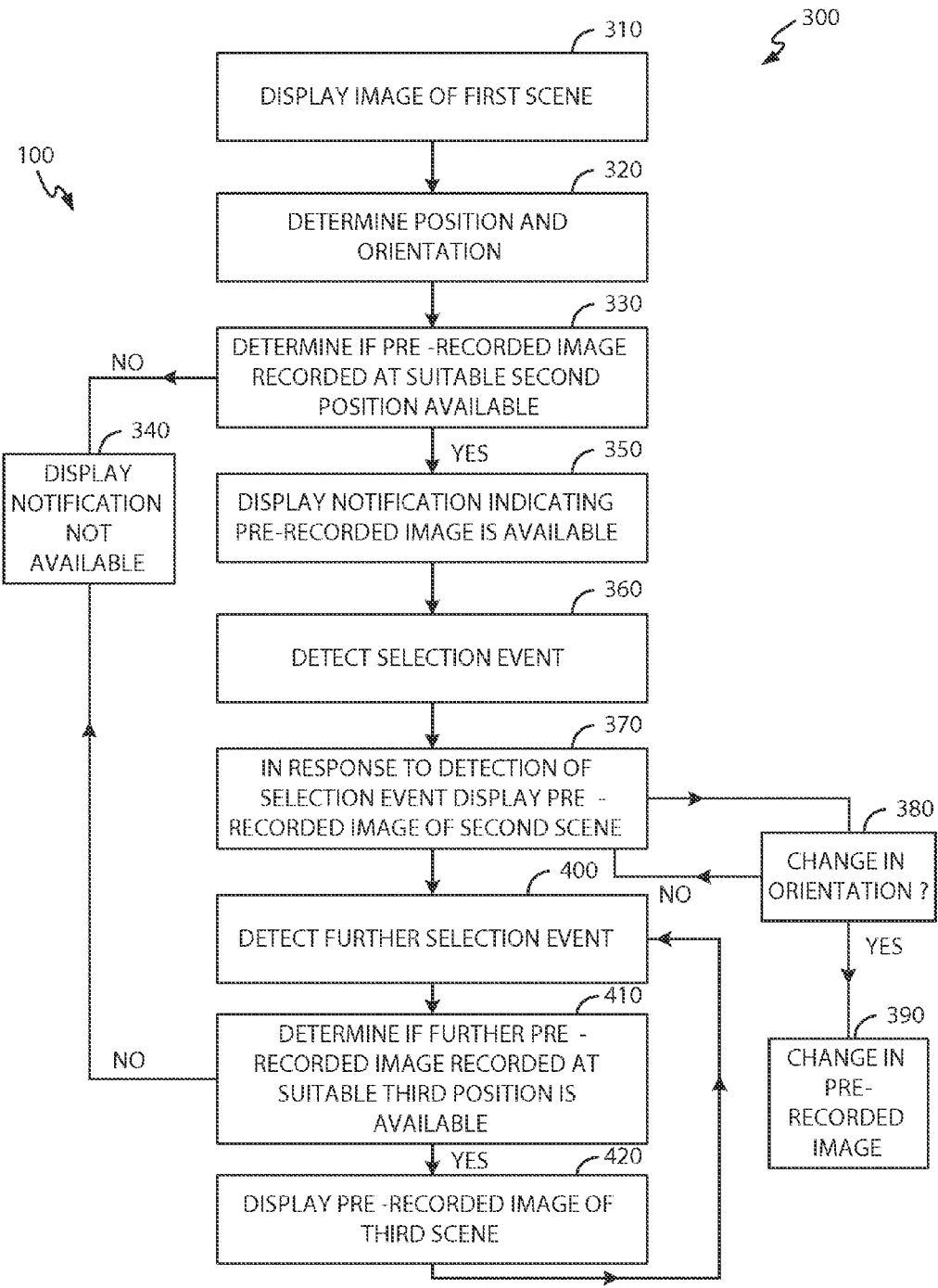
Figure 3:
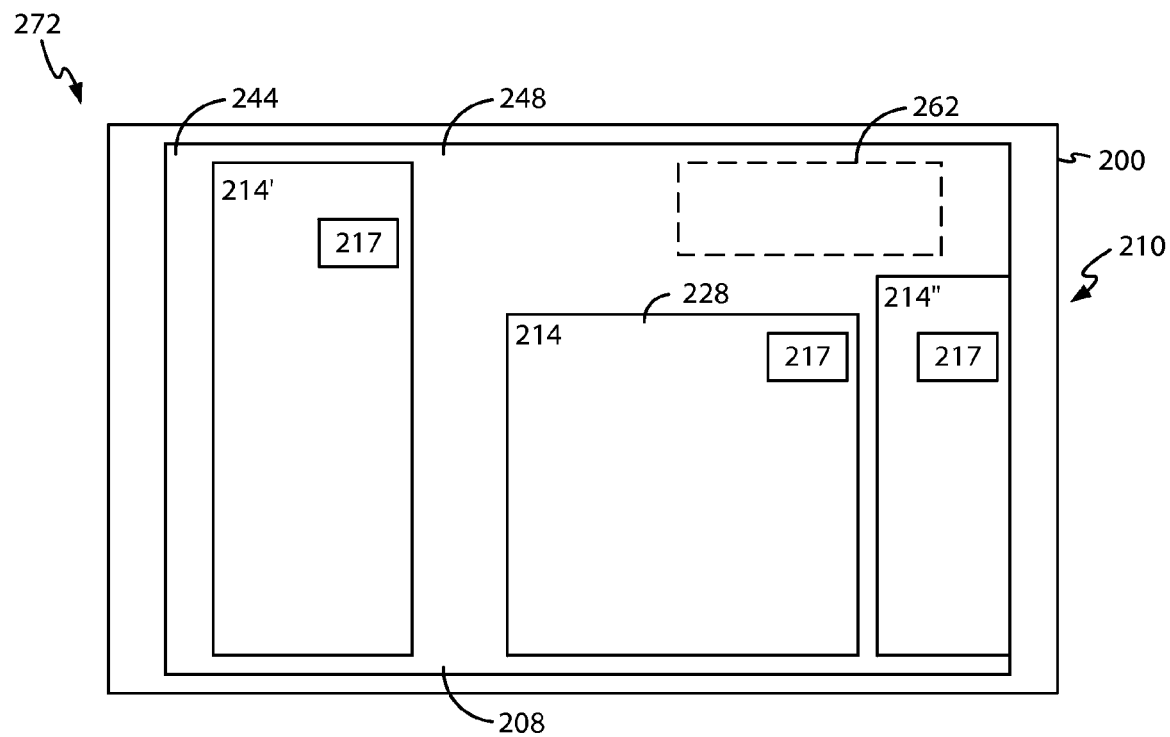
Figure 4:
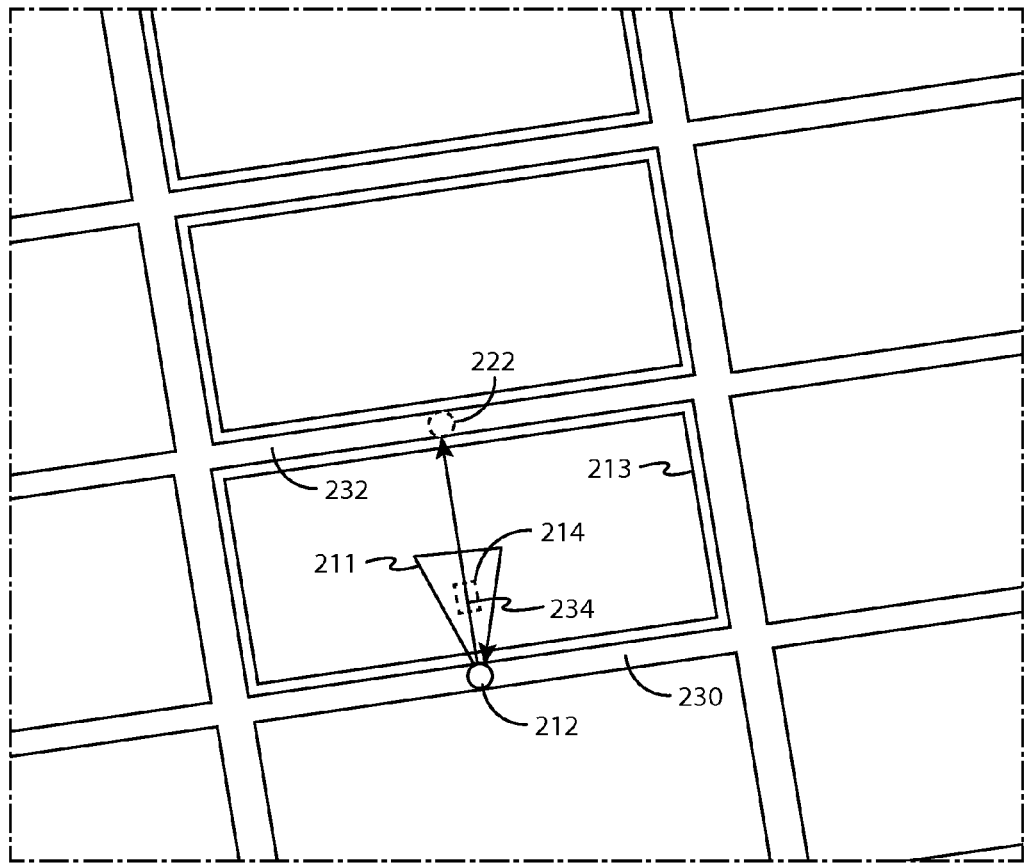
Figure 5:
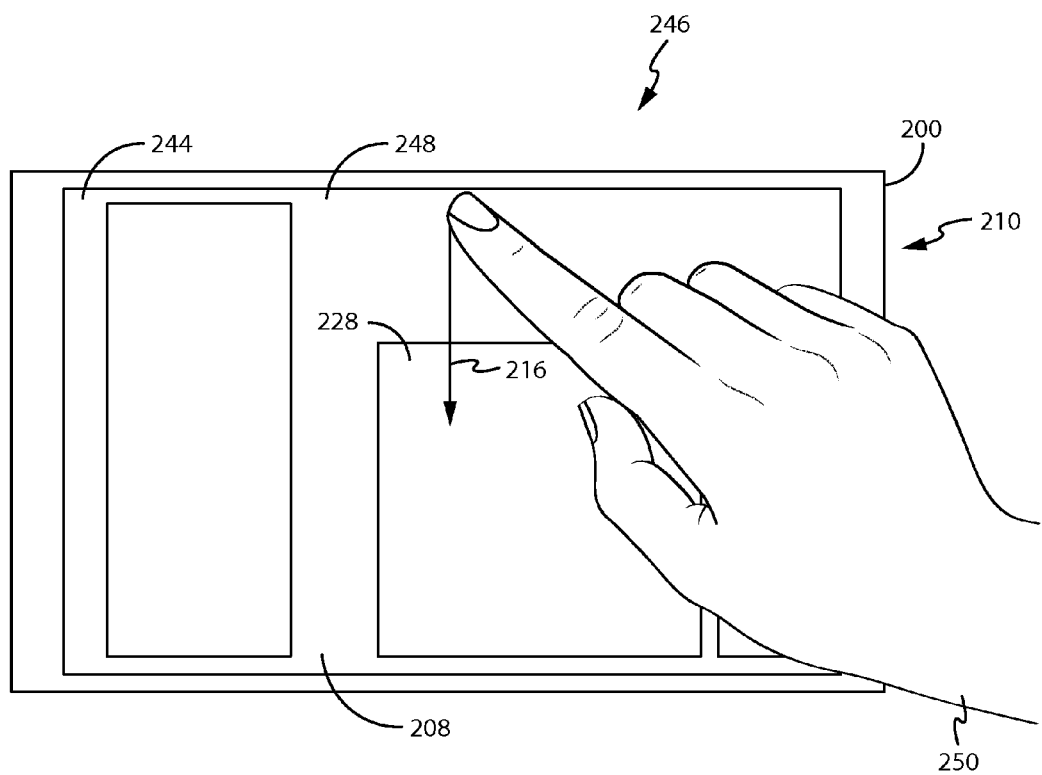
Figure 6:
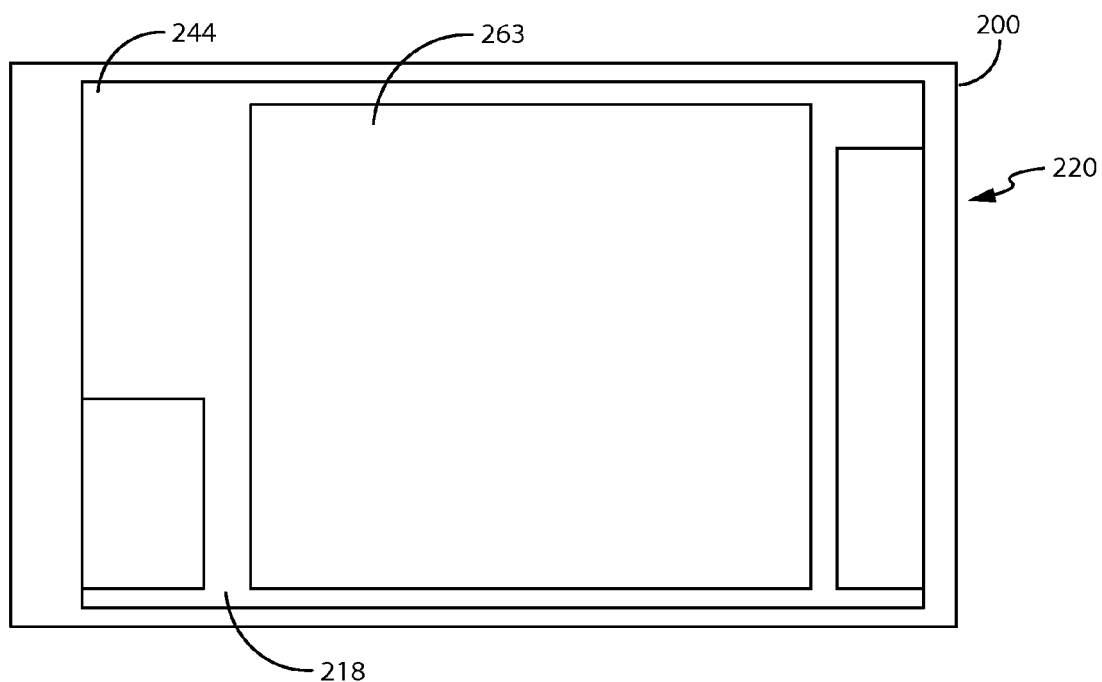
Figure 7:
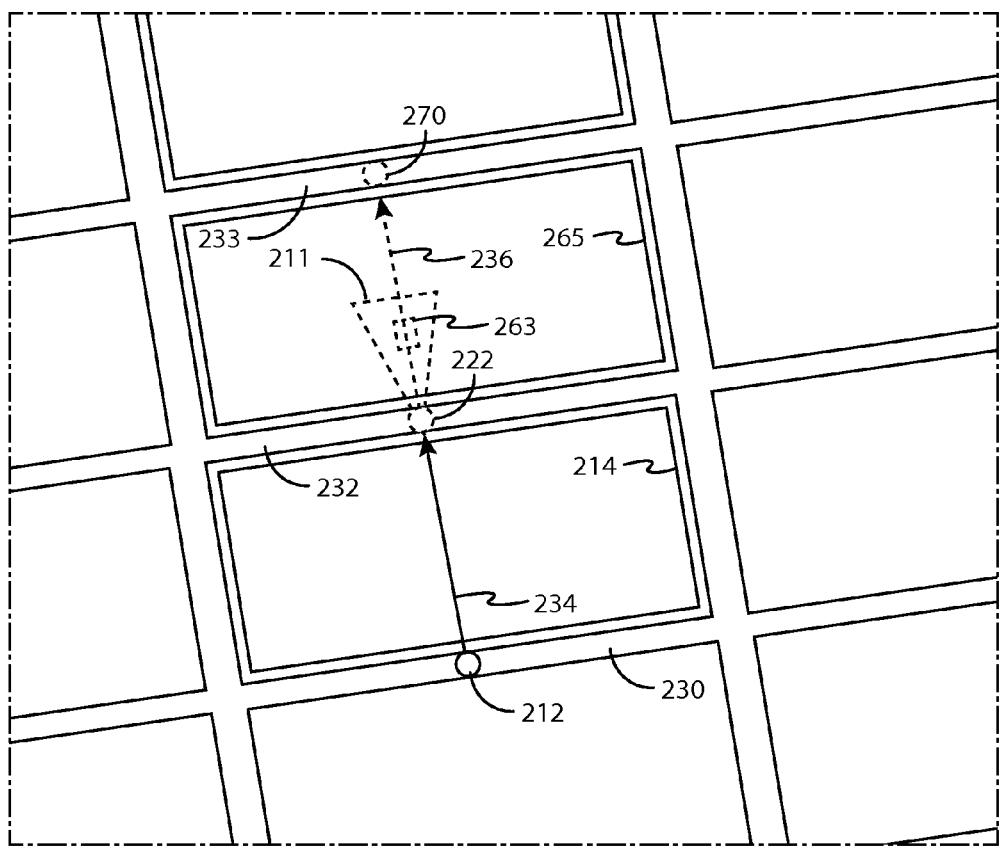
Figure 8:
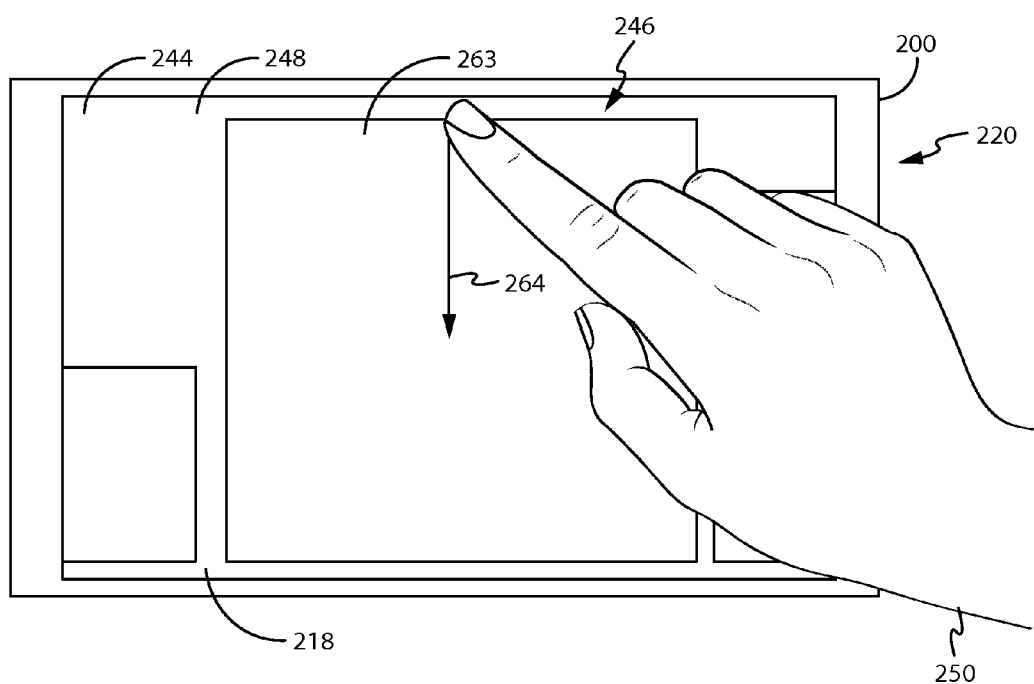
Figure 9:
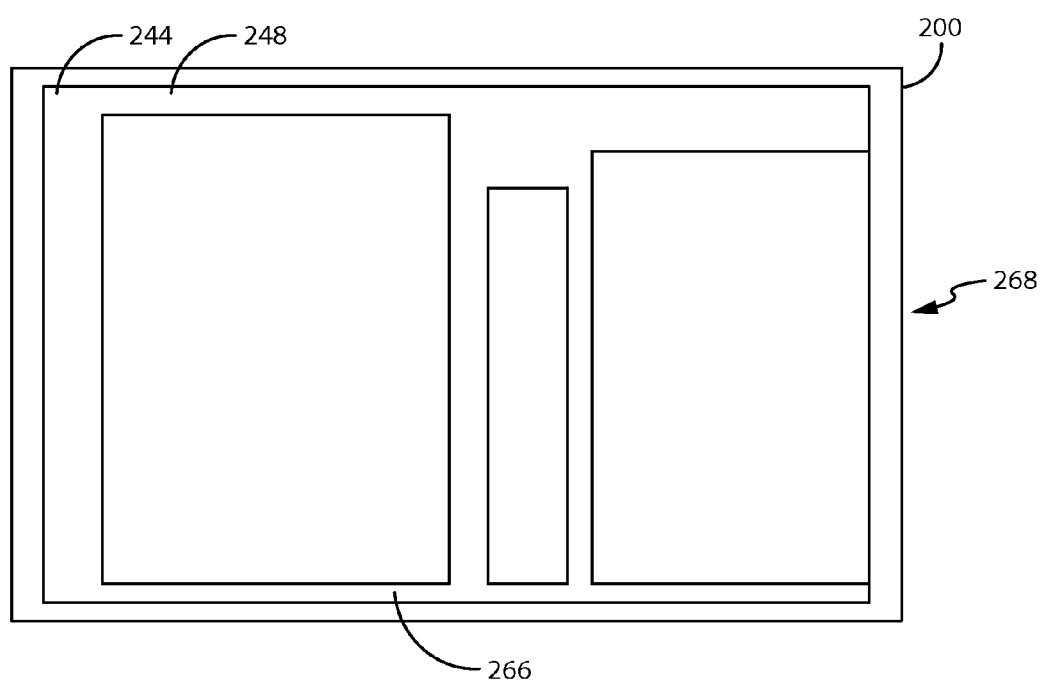
Figure 10:
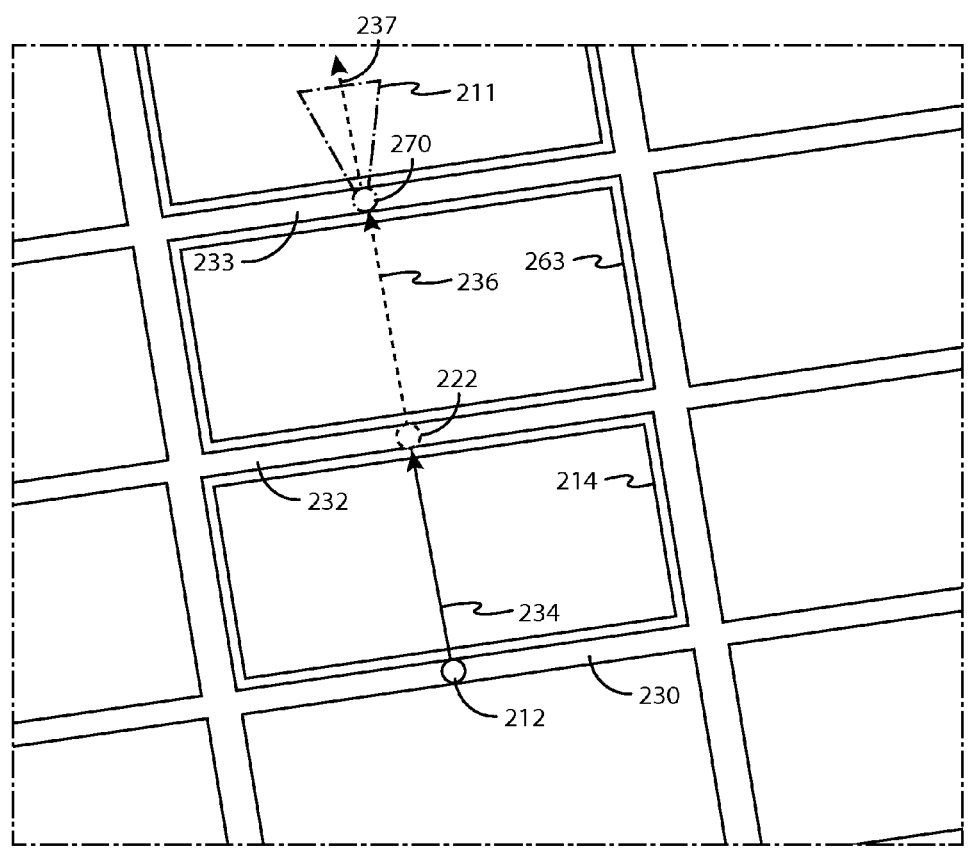
Figure 11:
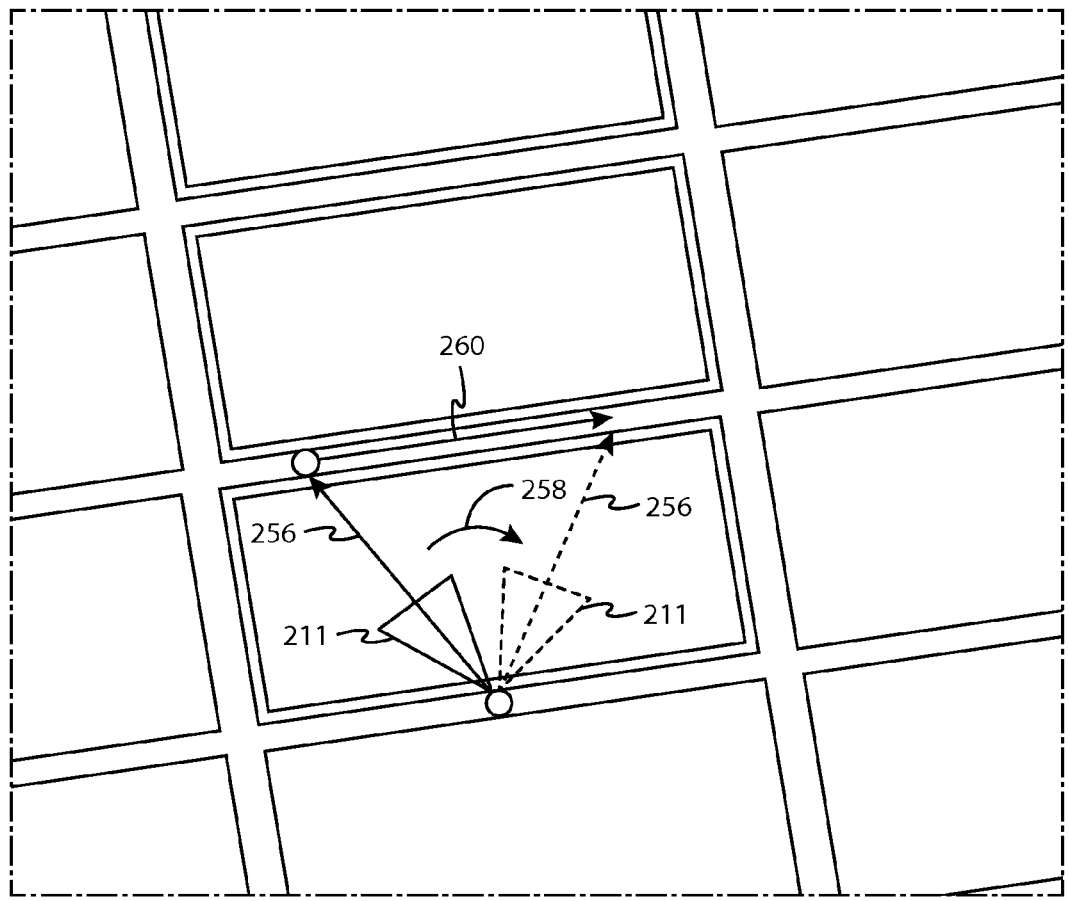
Figure 12:
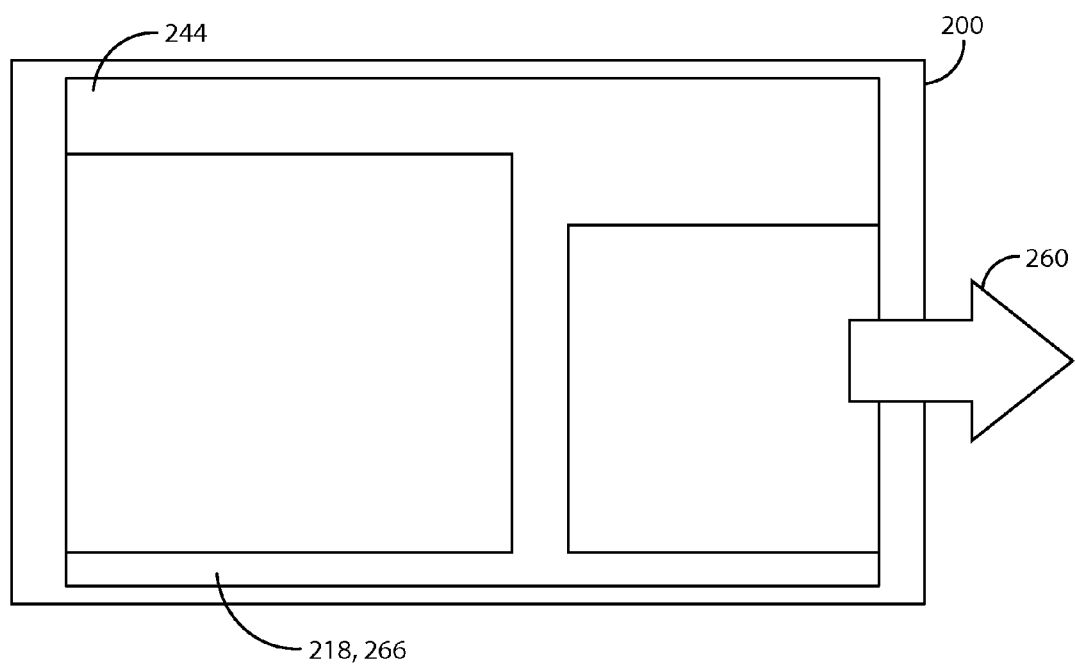
Figure 13:
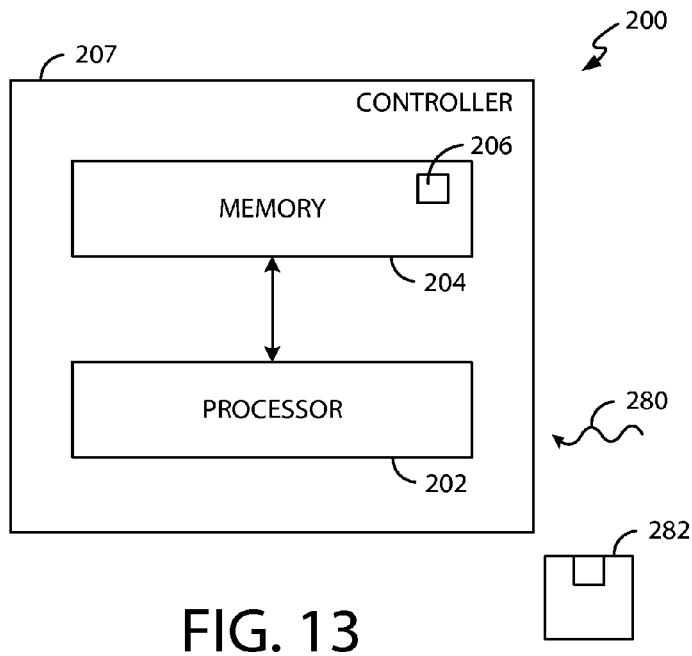
Figure 14:
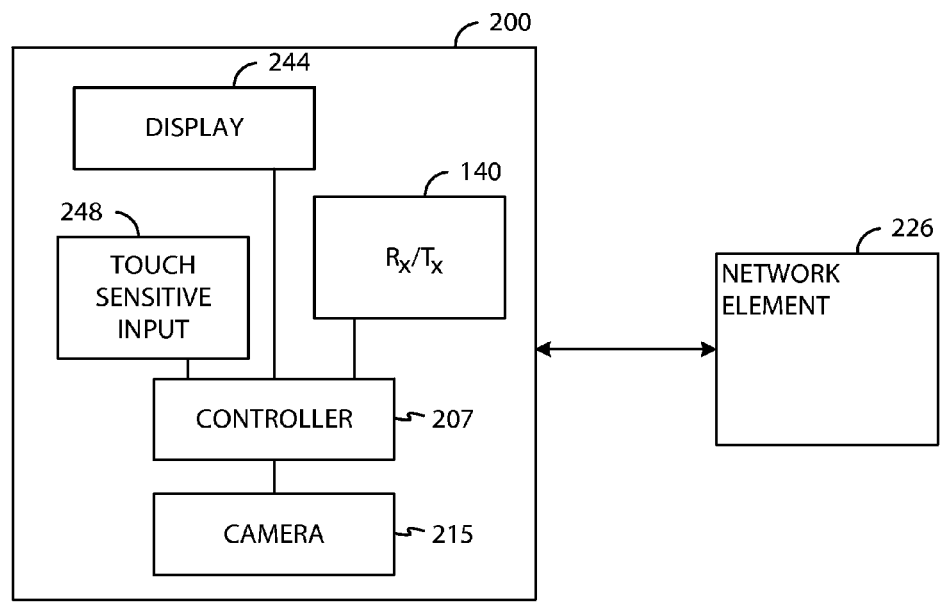

For a better understanding of various examples that are useful for understanding the brief description, reference will now be made by way of example only to the accompanying drawings in which:

FIG. 1 illustrates an example of a method 100;
FIG. 2 illustrates an example of a method 300;
FIG. 3 illustrates an example of an apparatus 200 displaying an image 208 of a first scene 210;
FIG. 4 illustrates an example of a plan, map view relating to the example of FIG. 3;
FIG. 5 illustrates an example of a selection event 216 associated with the first scene 210;
FIG. 6 illustrates an example of an apparatus 200 displaying a pre-recorded image 218 of a second scene 220;
FIG. 7 illustrates an example of a plan, map view relating to the example illustrated in FIG. 6;
FIG. 8 illustrates an example of a further selection event 264 associated with the second scene 220;
FIG. 9 illustrates an example of an apparatus 200 displaying a further pre-recorded image 266 of a third scene 268;
FIG. 10 illustrates an example of a plan, map view relating to the example illustrated in FIG. 9;
FIG. 11 illustrates a plan, map view of a user changing 258 the orientation 256 of the apparatus 200;
FIG. 12 illustrates an example of an apparatus 200 displaying a pre-recorded image 218, 266 and schematically illustrates a panning move 260;
FIG. 13 illustrates a controller 207 for an apparatus 200; and
FIG. 14 illustrates an example of an apparatus 200 configured to perform one or more of the methods 100, 300.

INTRODUCTION TO DETAILED DESCRITPTION

The figures illustrate a method 100 (FIGS. 1 & 2) comprising causing 110 display of an image 208 of a first scene 210 (FIG. 3) at a first position 212 (FIG. 4), the first scene 210 comprising at least one object 214; causing 120 detection of a selection event 216 (FIG. 5); and in response to detection of the selection event 216, causing 130 display of a pre-recorded image 218 of a second scene 220 (FIG. 6) recorded at a second position 222 (FIG. 7), wherein the at least one object 214 is between the first position 212 and the second position 222 (FIG. 7).

The method 100 may be carried out at an apparatus 200 (FIGS. 12, 13). The apparatus 200 comprising: means for performing the method 100. The means may comprise software only, hardware only or a combination of software and hardware.

As an example illustrated in FIG. 13, the apparatus 200 may comprise at least one processor 202; and at least one memory 204 including computer program code 206 the at least one memory 204 and the computer program code 206 configured to, with the at least one processor 202, cause the apparatus 200 at least to perform the method 100. The computer program 206, when run on a computer, enables the method 300 to be performed.

DETAILED DESCRIPTION

FIG. 1 illustrates an example of a method 100. The method 100 may, for example, be performed at an apparatus 200. The apparatus 200 may be configured as a mobile apparatus, for example, a hand-portable apparatus that is sized to be carried in a palm of the hand and fit into a shirt pocket.

The apparatus 200 may be a mobile personal communications apparatus that uses one or more wireless communication protocols (e.g. Bluetooth®, WLAN, 3GPP, etc), for example a mobile telephone.

The method 100 comprises:

At block 110, causing display of an image 208 of a first scene 210 at a first position 212, the first scene 210 comprising at least one object 214.

Then at block 120 causing detection of a selection event 216.

Then at block 130, in response to detection of the selection event 216, causing display of a pre-recorded image 218 of a second scene 220 recorded at a second position 222, wherein the at least one object 214 is between the first position 212 and the second position 222.

FIG. 2 illustrates an example of a method 300. The method 300 may, for example, be performed at an apparatus 200 which may be configured as a mobile apparatus as described above. The apparatus 200 may be a mobile personal communications apparatus as described above.

The method 300 is an example of an instance in a class of methods defined by the method 100 described in relation to FIG. 1. The method 300 has a plurality of features that are additional to the features of method 100. These additional features represent the difference between the method 100 and 300. Any features including one of the additional features or any combination of some of all of the additional features of the method 300 may be independently added to the method 100 to create a new instance in the class of methods defined by the method 100 described in relation to FIG. 1. Reference to "the method 100" refers to the method described with reference to FIG. 1 and reference to "the methods 100" refers to all instances in the class of methods defined by the method 100 described in relation to FIG. 1 which includes, for example, the method 100 and the method 300.

At block 310 of FIG. 2 an image 208 of a first scene 210 is displayed by an apparatus 200 on a display 244.

In some examples, but not necessarily all examples, the image 208 may be a pre-recorded image that was imaged at a first position 212. In examples, the pre-recorded image 208 may have been imaged by the apparatus 200 and stored in a memory 204 of the apparatus 200. Alternatively, in other examples, the pre-recorded image 208 may be received from one or more network elements 226 as illustrated in FIG. 14.

In other examples, the image 208 may be a real time or "live" image that is imaged by an apparatus 200 at a first position 212. For example, the image 208 may be imaged using a viewfinder function of the apparatus 200.

In examples where the image 208 is a real time image, the first position is the position of the apparatus 200 that is imaging the image 208.

As used herein, the terms "imaging"/"imaged" and similar are intended to include both temporary storage of image data in a memory, such as buffering, for example during the display of a real time image, and also the recording of an image into a memory for longer term storage and retrieval, for example the capturing of a photograph or video.

In some examples, but not necessarily all examples, the image 208 may be an augmented reality image from an apparatus 200 in which, for example, information is added into the image 208.

Referring to an example illustrated in FIG. 3, the first scene 210 comprises at least one object 214, which may be, for example, a building 228, or part of a building 228, a wall, a tree, an advertising sign and so on. In examples, the first scene 210 may comprise any number and combination of different objects.

The object 214 in the first scene 210 obscures an area of the scene 210 from view. For example, the scene 210 may comprise a building 228, beyond which it is not possible to see from the first position 212.

Referring to an example illustrated in FIG. 4, the image 208 may be imaged from a first orientation 234, which may be, for example, the direction the apparatus 200 is pointing when the image 208 is imaged.

Next at block 320 of FIG. 2 the first position 212 and first orientation 234 are determined. In examples where the image 208 is a real time image the current position and orientation of the apparatus 200 are determined.

In some examples, but not necessarily all examples, the current position and/or the current orientation of the apparatus may be determined by the apparatus 200 as the first position 212 and the first orientation 234. In other examples, the current position and/or the current orientation of the apparatus 200 may be received by the apparatus 200 and used as the first position 212 and the first orientation 234. The first position 212 and/or the first orientation 234 may, for example, be received from one or more network elements 226 as illustrated in FIG. 14.

In other examples, one of the current orientation and the current position may be determined by the apparatus 200 and the other may be received by the apparatus 200.

In examples where the image 208 is a pre-recorded image, the first position 212 and the first orientation 234 of the apparatus when the image 208 was recorded are determined. In some examples, but not necessarily all examples, the first position 212 and the first orientation 234 are stored in a memory 204 (FIG. 13) in association with the pre-recorded image 208. For example, the first position 212 and the first orientation 234 may be stored in a memory 204 of the apparatus 200 with the first position 212 and the first orientation 234 linked to the image 208.

In other examples, the first position 212 and the first orientation 234 of the pre-recorded image 208 may be received from one or more network elements 226. The first position 212 and the first orientation 234 of the pre-recorded image 208 may be received by the apparatus 200 from the network element 226 in response to the apparatus 200 sending a request to the network element 226.

Next at block 330 of FIG. 2 it is determined if a pre-recorded image 218 of a second scene 220 recorded at a second position 222 beyond the at least one object 214 is available. For example, it is determined if a pre-recorded image 218 is available from a second position 222 such that the at least one object 214 is between the first position 212 and the second position 222.

For example, as illustrated in FIG. 4, the first position 212 may be on a first thoroughfare 230 and the second position 222 may be on a second, different thoroughfare 232.

In some examples, but not necessarily all examples, the determination is made by accessing map information and determining a second position 222 on the basis of the first position 212 such that the at least one object 214 is between the first position 212 and the second position 222. There may be more than one second position 222 that is suitable.

In some examples, the first orientation 234 and/or the first position 212 of the at least one object may be used in the analysis.

For example, the first orientation 234 may define a heading that passes through the at least one object 214 and the second position 222 may be a point along the heading or a point sufficiently close to a point along the heading such that the at least one object 214 lies between the first position 212 and the second position 222.

The map information may be stored in a memory 204 of the apparatus. Additionally or alternatively, the map information may be stored at one or more network elements 226.

In some examples, analysis of the map information to determine the suitable second position(s) 222 may be performed by the apparatus 200. In other examples the analysis may be performed by one or more network elements 226. In some examples the analysis may partly be performed by the apparatus 200 in combination with one or more network elements 226.

It may then, for example, be determined if a pre-recorded image 218 recorded from a suitable second position 222 is available. The determination may be performed by the apparatus 200, one or more network elements 216 or a combination of the two.

The pre-recorded image 218 may be stored in a memory 204 of the apparatus 200 or may be received from one or more network elements as illustrated in FIG. 14. The second position 222 of the pre-recorded image 218 and the orientation of the pre-recorded image 218 as described in greater detail below, may be stored in association with the pre-recorded image 218.

If it is determined that a pre-recorded image 218 is not available from a suitable second position 222 a notification that no pre-recorded image is available may be displayed by the apparatus 200 (block 340 in FIG. 2). For example, text may be displayed over at least a part of the image 208 being displayed and/or an icon may be displayed over at least a portion of the image 208 being displayed. Additionally/alternatively the notification may comprise a change in the image 208, for example the brightness and/or contrast and/or colouring of the image 208 may temporarily be changed.

In some examples, the notification may additionally or alternatively comprise an audio and/or haptic feedback output by the apparatus 200.

If it is determined that a pre-recorded image 218 is available from a suitable second position 222 a notification that a pre-recorded image is available may be displayed by the apparatus 200 (block 350 of FIG. 2).

For example, text may be displayed over at least a part of the image 208 being displayed and/or an icon may be displayed over at least a part of the image 208 being displayed. Additionally/alternatively the notification may comprise a change in the image 208, for example the brightness and/or contrast and/or colouring of the image 208 may temporarily be changed.

In some examples, the notification may additionally or alternatively comprise an audio and/or haptic feedback output by the apparatus 200.

Next at block 360 of FIG. 2 a selection event 216 is detected. The selection event may be any suitable indication by a user 250 of the apparatus that the pre-recorded image 218 of a second scene 220 recorded at the second position 222 should be displayed.

For example, the selection event may comprise a selection from a menu structure and/or a keystroke.

In some examples, but not necessarily all examples, the selection event may comprise a gesture 246 which may also be considered a gesture user input 246.

A gesture user input 246 is a gesture that has meaning to an apparatus 200 as a user input. A gesture may be static or moving.

A moving gesture may comprise a predetermined movement or a predetermined movement pattern comprising a series of movements. For example it could be making a circling motion or a side to side or up and down motion or the tracing of a sign in space.

A moving gesture may, for example, be an apparatus-independent gesture or an apparatus-dependent gesture.

An apparatus-independent gesture is decoupled from the apparatus 200 and involves movement of a user input object e.g. a user body part or parts, or a further apparatus, relative to the user apparatus 200. The movement may be three dimensional, for example, through a space external to the apparatus 200. The body part may comprise the user's hand or part of the user's hand such as one or more fingers and thumbs. In other examples, the user input object may comprise a different part of the body of the user such as their head. An apparatus-dependent gesture involves movement of a user apparatus 200 through space. The movement may be three dimensional.

Three-dimensional movement may comprise motion of the user input object in any three orthogonal directions. The motion may comprise the user input object moving towards or away from an apparatus 200 as well as moving in a plane parallel to the apparatus 200 or any combination of such motion.

A gesture may be a non-contact gesture. A non-contact gesture does not contact the apparatus 200 at any time during the gesture.

A gesture may be an absolute gesture that is defined in terms of an absolute displacement from the user apparatus 200. Such a gesture may be tethered, in that it is performed at a precise location relative to the apparatus 200. Alternatively a gesture may be a relative gesture that is defined in terms of relative displacement during the gesture. Such a gesture may be un-tethered, in that it need not be performed at a precise location relative to the apparatus 200 and may be performed at a large number of arbitrary locations.

A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture may be performed in one dimension (1D gesture), two-dimensions (2D gesture) or three dimensions (3D gesture).

In some examples, the gesture 246 may comprise the user 250 making a downward movement, for example, with his hand.

The gesture 246 may comprise the user touching a touch sensitive input 248 of the apparatus 200. For example, the gesture 246 may comprise the user sliding their finger down the touch sensitive input 248 (FIG. 5).

The touch sensitive input 248 may, for example, be separate from the display 244. In other examples the apparatus 200 may comprise a touch sensitive display, combining the touch sensitive input 248 and the display 244.

A gesture 246 comprising a downward motion of a hand, for example a sliding motion on a touch sensitive input 248, provides an intuitive way of swapping from the first image 208 to the pre-recorded image 218. This is because it may provide a user 250 with the sensation the he is moving the at least one object 214 out of the way to see what is beyond the object 214.

Next at block 370 in FIG. 2, in response to detection of the selection event 216 the pre-recorded image 218 of the second scene 220 recorded at the second position 222 is displayed by the apparatus 200 on the display 244. An example of a pre-recorded image of a second scene 220 is provided in FIG. 6.

In some examples, the pre-recorded image 218 may completely replace the image 208 that was being displayed. In other examples, the pre-recorded image may not completely replace the image 208 and may partially replace the image 208. The image 208 and the pre-recorded image may be displayed at the same time, for example side by side or one above the other.

As described above and illustrated in the example of FIG. 7, the at least one object 214 is between the first position 212 of the first image 208 and the second position 222 of the pre-recorded image 218. The pre-recorded image 218 may therefore allow a user 250 to see what is beyond the at least one object 214 that is obscuring the view from the first position 212 of the image 208.

The pre-recorded image 218 may be recorded at a second orientation 236. The second orientation 236 may be the direction from which the pre-recorded image 218 was recorded.

In some examples, but not necessarily all examples, the second orientation 236 may be constrained by the first orientation 234 of the first image 208. In some examples, the second orientation 236 may be constrained to be matched to the first orientation 234. That is, the second orientation 236 may define a second heading constrained to lie along the first heading defined by the first orientation 234.

In some examples, the second orientation 236 may be constrained to be matched to the first orientation 234 within a pre-defined tolerance.

In some examples, the constraining of the second orientation 236 may be considered as part of the determination if a pre-recorded image 218 is available at block 330 of FIG. 2.

The constraining of the second orientation 236 by the first orientation 234 may also provide the user 250 with the sensation that the at least one object 214 is being moved out of the way.

In some examples, the second scene 220 may comprise at least one further object 263, which may be, for example, a building, or part of a building, a wall, a tree, an advertising sign and so on. In examples, the second scene 220 may comprise any number and combination of different objects.

The further object 263 in the second scene 220 may obscure an area of the scene 220 from view. For example, the scene 220 may comprise a building, beyond which it is not possible to see from the second position 222.

Next at block 400 in FIG. 2, a further selection event 264 may be detected. The further selection event 264 may be as described above with regard to the selection event 260. For example, the further selection event 264 may comprise a gesture 246 which may comprise a downwards motion, for example, as illustrated in FIG. 8.

In some examples the further selection event 264 may be the same as or similar to the first selection event 216. In other examples, the further selection event 264 may be different to the first selection event 216.

Next at block 410 of FIG. 2, it is determined if a further pre-recorded image 266 of a third scene 268 recorded from a third position 270 beyond the at least one further object 263 such that the at least one further object 263 is between the second position 222 and the third position 270 is available.

The determination at block 410 may be performed as described above with regard to block 330.

If it is determined that no further pre-recorded image 266 from a suitable third position 270 is available the method 300 may proceed to block 340 of FIG. 2 and a notification may be displayed.

If it is determined that a further pre-recorded image 266 from a suitable third position 270 is available the method 300 may proceed to block 420 of FIG. 2. and the further pre-recorded image 266 of the third scene 268 is displayed by the apparatus 200. An example of a third scene 268 is provided in FIG. 9.

As described above and illustrated in the example of FIG. 10, the at least one further object 263 is between the second position 222 of the pre-recorded image 218 and the third position 270 of the further pre-recorded image 266. The further pre-recorded image 266 may therefore allow a user 250 to see what is beyond the at least one further object 263 that is obscuring the view from the second position 222 of the pre-recorded image 218.

The method 300 may then return to block 400. The description above in relation to blocks 400, 410, 420 regarding the pre-recorded image 218 of the second scene 220 is then concerned with the further pre-recorded image 266 of the third scene.

In some examples, if, while displaying the pre-recorded image of the second scene 220, a change in the orientation of the apparatus 200 is detected at block 380 of FIG. 2, the method proceeds to block 390. This applies equally to display of the further pre-recorded image 266 of the third scene 268 at block 420 but is not illustrated in the example of FIG. 2.

The change in orientation of the apparatus 200 may be caused by a user 250 turning the apparatus 200.

At block 390, in response to a change in the orientation of the apparatus 200, there is a change in the pre-recorded image 218, 266 being displayed. For example, the change in orientation could cause zooming in the pre-recorded image 218, 266.

In some examples, but not necessarily all examples, the change in orientation of the apparatus 200 causes a move in the pre-recorded image 218, 266. This will change the scene 220, 268 that is displayed in the pre-recorded image 218, 266. For example, the move may be a panning move 260.

The panning move 260 may change the position 222, 270 and/or the orientation 236, 237 of the pre-recorded image. For example, a change in the orientation of the apparatus 200 may cause a change in the orientation 236, 237 of the pre-recorded image 218, 266 and allow the user to explore the view from the second position 222 or third position 270.

In other examples, a change in orientation of the device 200 may cause a change in the position 222, 270 of the pre-recorded image 218, 266 but not the orientation 236, 237. For example, this may allow a user to explore along a nearby thoroughfare 232, 233 that is hidden from view.

In other examples, a change in the orientation of the apparatus 200 may cause a change in both the position 222, 270 and the orientation 236, 237 of the pre-recorded image 218, 266.

Although the above description in relation to FIG. 2 recites "displaying", "determining", "detecting" and so on, it is also intended to include causing the blocks of method 300 to occur. For example, "causing display of", "causing determination of", "causing detection of" and so on.

FIG. 3 illustrates an example of an apparatus 200 displaying an image 208 of a first scene 210. The image 208 comprises a plurality of substantially opaque objects 214, 214' and 214", the central object 214 being a building 228. The other objects 214' and 214" may also be buildings or may be different objects.

In the illustrated example, the apparatus is a mobile telephone 272 comprising a display 244, with touch sensitive input 248, upon which the image 208 is displayed. However, in other examples the apparatus 200 could be any suitable apparatus such as a mobile electronic device, a tablet, a computer, a personal digital assistant and so on.

In the example of FIG. 3 the apparatus 200 is displaying a real time or "live" view (block 310 of FIG. 2). In the example a user of the apparatus 200 is exploring a city using the viewfinder of the apparatus 200.

In FIG. 3 the image 208 is the first scene 210 that is visible from the current first position 212 and first orientation 234 of the apparatus 200. The image 208 is being imaged by a camera 215 (not shown in FIG. 3) of the apparatus 200 and displayed in real time on the display 200.

The image 208 may be an augmented reality view in which information 217 is displayed relating to one or more of the objects 214, 214' and 214" in the image 208. For example, the name of the building 228 may be displayed. In addition, information relating to one or more objects in the direction that the apparatus is facing but not visible in the image 208 may also be displayed in the augmented reality view.

FIG. 4 illustrates an example of a plan, map view relating to the example of FIG. 3. The map view may be provided as part of a map application available at the apparatus 200. In some examples, the map view may be displayable on the display 244 of the apparatus 200.

In the example of FIG. 4, the apparatus 200 is at a first position 212 and has a first orientation 234. The first position 212 is on a first thoroughfare 230. The triangular shape projecting from the apparatus 200 indicates the field of view 211 from the apparatus 200.

As illustrated in FIG. 3 there are a plurality of objects 214, 214', 214" in the field of view 211 of the apparatus. The single block 213 in FIG. 4 is a schematic representation of the plurality of objects and may represent any number of different objects.

In the example of FIG. 3, the building 228 obscures the user's view and the user would like to see what is beyond the building 228.

The first position 212 and the first orientation 234 of the apparatus 200 have been determined as illustrated in the map view of FIG. 4 (block 320 of FIG. 2). In some examples, this determination may be carried out by the apparatus 200, by the apparatus 200 in combination with one or more network elements 226 or may be determined by one or more network elements 226 and received by the apparatus 200.

In some examples, the apparatus may comprise means for determining its position. For example, the apparatus may be able to determine its position using a satellite position system or using signals from one or more network elements.

In some examples, the apparatus may comprise means for determining its orientation such as a compass, magnetometer, gyroscope, accelerometer or any other suitable means.

In the example of FIG. 4 a suitable second position 222 has been determined and it has been determined that a pre-recorded image 218 is available at the second position 222 (block 330 of FIG. 2). The second position 222 is on a second, different thoroughfare 232 and the at least one object 214 is between the first position 212 and the second position 222.

In the example of FIG. 4, the heading defined by the first orientation 234 passes through the first position 212, the object 214 and the second position 222.

Returning to the example of FIG. 3, a notification 262 is displayed indicating that a pre-recorded image 218 at the second position 222 is available (block 350 of FIG. 2). The notification may, for example, comprise displayed text, a displayed icon, audio output and/or haptic feedback.

In order to switch from the real time image 208 at the first position 212 to the pre-recorded image 218 at the second position 222 the user performs a selection event 216 that is detected by the apparatus 200 (block 360 of FIG. 2).

FIG. 5 illustrates an example of a selection event 216 performed in association with the first scene 210. In the illustrated example the apparatus 200 comprises a touch sensitive input 248 integrated with the display 244 to form a touch sensitive display. The display 244 displays the first scene 210.

In FIG. 5 the selection event 216 comprises a gesture 246. The gesture 246 comprises in this example the user 250 sliding a finger in a downward motion while contacting the touch sensitive input 248. In this example the gesture 246 is associated with the building 228 because it passes over the building 228.

In response to the selection event 216 the apparatus 200 displays the pre-recorded image 218 of the second scene 220 recorded at the second position 222 (block 370 of FIG. 2).

FIG. 6 illustrates an example of an apparatus 200 displaying on display 244 a pre-recorded image 218 of a second scene 220. In the illustrated example, the pre-recorded image 218 comprises a plurality of objects including a further object 263.

FIG. 7 illustrates an example of a plan, map view relating to the example illustrated in FIG. 6.

In FIG. 7 the position and orientation of the apparatus 200 remain unchanged. In some examples, the position and orientation of the apparatus 200 may change slightly over time as the apparatus is being held by a user 250. However, changes in the position and/or the orientation of the apparatus 200 under a threshold may be ignored by the apparatus when displaying the pre-recorded images 218, 266.

The pre-recorded image 218 illustrated in the example of FIG. 6 was recorded at the second position 222 and has a field of view 211 as indicated by the dashed triangular shape in FIG. 7.

In the illustrated example, the pre-recorded image 218 has a second orientation 236 which is constrained by the first orientation 234. The second orientation 236 in FIG. 7 has the same orientation or similar orientation to within a pre-specified tolerance as the first orientation 234. The pre-recorded image 218 is therefore oriented in substantially the same direction as the apparatus 200, at the first position 212, is pointing.

The plurality of objects including the further object 263 in the pre-recorded image 218 of FIG. 6 is schematically illustrated as a single block 265 in the example of FIG. 7. The single block 265 may represent any number of different objects.

The user 250 may make a further selection event 264 in association with the second scene 220 as illustrated in the example of FIG. 8 (block 400 of FIG. 2). In the example of FIG. 8 the selection event 264 also comprises a gesture 246 in which the user 250 slides his finger in a downward motion on the touch sensitive input 248.

Returning to the example of FIG. 7 a suitable third position 270 has been determined. The third position 270 is on a further, different thoroughfare 233 and is a point along the second orientation 236. The further object 263 is between the second position 222 and the third position 270, along a heading defined by the second orientation 236.

If a further pre-recorded image 266 of third scene 268 recorded at the third position 270 is available (block 410 of FIG. 2) it may be displayed.

FIG. 9 illustrates an example of an apparatus 200 displaying in display 244 a further pre-recorded image 266 of a third scene 268 recorded at the third position 270 (block 420 of FIG. 2). In the illustrated example, the pre-recorded image 266 comprises a plurality of objects.

FIG. 10 illustrates an example of a plan, map view relating to the example illustrated in FIG. 9.

In FIG. 10 the first position 212 and the first orientation 234 of the apparatus remain unchanged. In some examples, the first position 212 and the first orientation 234 of the apparatus 200 may change slightly over time as the apparatus is being held by a user 250. However, changes in the first position 212 and/or the first orientation 234 of the apparatus 200 under a threshold may be ignored by the apparatus when displaying the pre-recorded images 218, 266.

The pre-recorded image 266 illustrated in the example of FIG. 9 was recorded at the third position 270 and has a field of view 211 as indicated by the dot-dashed triangular shape in FIG. 10.

In the illustrated example, the further pre-recorded image 266 has a third orientation 237 which may be constrained by the first orientation 234 and/or the second orientation 236.

In some examples the user may make a particular selection event, for example a gesture, to cause the apparatus 200 to switch from displaying a real-time image 208 (FIG. 3) to displaying the further pre-recorded image 266 (FIG. 9) without displaying the pre-recorded image 218 (FIG. 6). For example, if a particular selection event 216 is detected the apparatus 200 may go from the example illustrated in FIG. 3 to the example illustrated in FIG. 9.

In some examples, the gestures such as gestures 246 in FIGS. 5 and 8 may be performed anywhere on the touch sensitive input 248, which in the illustrated examples is the display 244. For example, the gesture 246 illustrated in FIG. 5 may start and finish at different points compared to the gesture illustrated in FIG. 8.

In other examples the gesture 246 may only be recognised by the apparatus if it is performed in association with the object 214, 263. The object 214, 263 may be considered the obscuring object.

The image 208 and/or pre-recorded image 218 may be analysed to detect the objects present in the images. The analysis may be performed at the apparatus 200, at one or more network elements 226 or a combination of the apparatus 200 and one or more network elements 226.

Any suitable image analysis may be used. For example, the edges of a building 228 or features of a building 228 such as windows may be detected to determine the location of the building 228 in the image 208, 218.

Additionally/alternatively the user 250 may indicate to the apparatus 200 where the objects in the image are located. For example, the user 250 may enter lines/shapes on the touch sensitive input 248 indicating where the various objects are located.

In some examples the orientation 234, 236 may be considered in the analysis to determine which of the various objects is considered as the obscuring object by the user 250. For example, the object that is most central in the image 208, 218 may be considered the obscuring object.

Following the image analysis, in some examples the gesture 246 will only be recognised if it is performed in association with the obscuring object 214, 263. For example, in FIGS. 5 and 8 the gesture may only be recognised if it is performed on the obscuring object 214, 263.

In some examples, but not necessarily all examples, when the apparatus is displaying the pre-recorded image 218 of the second scene 220 or the further pre-recorded image 266 of the third scene 268, if the user changes the orientation of the apparatus the apparatus may change the pre-recorded image 218, 268 being displayed.

FIG. 11 illustrates a plan, map view of a user changing 258 the orientation 256 of the apparatus 200.

In the illustrated example, the user rotates the apparatus 200 to the right, changing the field of view 211 of the apparatus 200 from the solid triangular shape to the dashed triangular shape in FIG. 11.

In the example of FIG. 11 the change 258 in the orientation 256 of the apparatus causes a panning move 260 in the pre-recorded image 218, 266. The position of the pre-recorded image is changed in line with the change in orientation and the scene displayed in the pre-recorded image is also changed.

In this way a user may simply and easily explore nearby locations, such as thoroughfares that are obscured from view by one or more objects.

FIG. 12 illustrates an example of an apparatus 200 displaying a pre-recorded image 218, 266 and schematically illustrates a panning move 260 to the right caused by a change in orientation of the apparatus 200. The displayed content scrolls to the left within the display 244 so that less of the leftmost object is displayed and more of the rightmost object is displayed.

FIG. 13 illustrates a controller 207 for an apparatus 200. In some examples, but not necessarily all examples, the controller 207 may be a module such as a chip or chipset.

In some examples, but not necessarily all examples, the controller 207 comprises a processor 202 and a memory 204. The processor 202 is configured to read from and write to the memory 204.

Implementation of controller can be in hardware alone (a circuit, a processor . . . ), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc) to be executed by such a processor.

The processor 202 is configured to read from and write to the memory 204. The processor 202 may also comprise an output interface via which data and/or commands are output by the processor 202 and an input interface via which data and/or commands are input to the processor 202.

The memory 204 stores a computer program 206 comprising computer program instructions (computer program code) that controls the operation of the apparatus 200 when loaded into the processor 202. The computer program instructions, of the computer program 206, provide the logic and routines that enables the apparatus to perform the methods illustrated in FIGS. 1 and 2. The processor 202 by reading the memory 204 is able to load and execute the computer program 206.

The apparatus 200 therefore comprises:

at least one processor 202; and at least one memory 204 including computer program code 206 the at least one memory 204 and the computer program code 206 configured to, with the at least one processor 202, cause the apparatus 200 at least to perform:

causing display of an image of a first scene at a first position, the first scene comprising at least one object;

causing detection of a selection event; and in response to detection of the selection event, causing display of a pre-recorded image of a second scene recorded at a second position, wherein the at least one object is between the first position and the second position.

The computer program 206 may arrive at the apparatus 200 via any suitable delivery mechanism 282. The delivery mechanism 282 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 206. The delivery mechanism may be a signal 280 configured to reliably transfer the computer program 206. The apparatus 200 may propagate or transmit the computer program 206 as a computer data signal.

Although the memory 206 is illustrated as a single component it may be implemented as one or more separate components some or all of which may be integrated/removable and/or may provide permanent/semi-permanent/dynamic/cached storage.

Although the processor 200 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

As used here 'module' refers to a unit or apparatus that excludes certain parts/components that would be added by an end manufacturer or a user.

The blocks illustrated in the FIGS. 1 and 2 may represent steps in a method and/or sections of code in the computer program 206. The illustration of a particular order to the blocks does not necessarily imply that there is a required or preferred order for the blocks and the order and arrangement of the blocks may be varied. Furthermore, it may be possible for some blocks to be omitted.

For example, blocks 340 and 350 of FIG. 2 may be omitted. As a further example, block 330 of FIG. 2 may be after block 360 of FIG. 2.

In another example, block 410 may precede block 400 in FIG. 2. Also, for example, a further block the same as block 350 may be inserted between blocks 400 and 410 of FIG. 2.

FIG. 14 illustrates an example of an apparatus 200 configured to perform one or more of the methods 100, 300. The apparatus 200 comprises a controller 207, a storage memory 290, a display 244, user input 292 and a radio transceiver 140.

The controller 207 may be a controller as described in relation to FIG. 13, alternatively it may be a different controller. For example, it may be a hardware controller such as an application specific integrated circuit (ASIC) or it may be a general purpose central processing unit of the user apparatus 200.

The controller 207 is configured to provide display commands to the display 244.

The controller 207 may, for example, be configured to control the display 244 to display the first image 208, the pre-recorded image 218 and the further pre-recorded image 266

The controller 207 is configured to provide data to the radio transceiver 140 for transmission to the one or more network elements 226. The controller 207 is configured to receive from the radio transceiver 140 data received from the one or more network elements 226.

The apparatus 200 may communicate with the one or more network elements wirelessly.

In this example, but not necessarily all examples, the wireless communication is radio frequency communication. It may use near field communication or far field communication. It may use a multiple access communication protocol. It may be a terminal using a mobile cellular communications protocol.

The controller 207 is configured to receive user input commands from a user input. The user input may, in some examples comprise a touch sensitive input 248 which may comprise a touch sensitive display. In some examples, but not necessarily all examples, the user input comprises one or more sensors for sensing spatial relationship(s). The sensors may include one or more of: a magnetometer, a gyroscope, one or more accelerometers, one or more distance sensors. The sensors are configured to generate user input commands in response to movement (position and/or orientation) of the user apparatus 200. These sensors may enable the user apparatus 200 to detect changes in its x, y and z position and also detect roll, yaw and pitch.

The controller 207 is configured to cause display of an image of a first scene at a first position, the first scene comprising at least one object;

to cause detection of a selection event; and in response to detection of the selection event, to cause display of a pre-recorded image of a second scene recorded at a second position, wherein the at least one object is between the first position and the second position.

In FIG. 14, the components of the apparatus 200 may be operationally coupled to the processor 202 and any number or combination of intervening elements can exist (including no intervening elements).

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code, the at least one memory and the computer program code configured to, with the at least one processor, cause the apparatus at least to perform:
   causing display of a first scene at a first position captured from a first orientation, the first scene comprising a substantially real time video of at least one physical object;
   causing detection of a selection event on a display showing the substantially real time video of the at least one physical object; and
   in response to the detection of the selection event, causing display of a pre-recorded image of a second scene recorded at a second position, wherein the at least one physical object is between the first position and the second position, and wherein the pre-recorded image of the second scene recorded at the second position is determined based on the first position and the first orientation.

2. An apparatus as claimed in claim 1, wherein the pre-recorded image is received from one or more network elements.

3. An apparatus as claimed in claim 1, wherein the first position is on a first thoroughfare and the second position is on a second, different thoroughfare.

4. An apparatus as claimed in claim 1, wherein the second position is constrained by the first position and the at least one physical object such that the at least one physical object is between the first position and the second position.

5. An apparatus as claimed in claim 1, wherein the apparatus further comprises a display and the at least one memory and the computer program code are further configured to, with the at least one processor, cause the apparatus at least to perform displaying the substantially real time video of the first scene on the display and displaying the pre-recorded image on the display.

6. An apparatus as claimed in claim 1, wherein the selection event comprises a gesture.

7. An apparatus as claimed in claim 6, wherein the apparatus comprises a touch sensitive input and the gesture comprises a user touching the touch sensitive input.

8. An apparatus as claimed in claim 6, wherein the gesture comprises a moving gesture.

9. An apparatus as claimed in claim 8, wherein the moving gesture comprises a downwards movement.

10. An apparatus as claimed in claim 1, wherein the pre-recorded image comprises at least one further object and the at least one memory and the computer program code are further configured to, with the at least one processor, cause the apparatus at least to perform:
    causing detection of a further selection event;
    in response to detection of the further selection event, causing display of a further pre-recorded image of a third scene recorded at a third position, wherein the at least one further object is between the second position and the third position.

11. A method comprising:
    causing display of a first scene at a first position captured from a first orientation, the first scene comprising a substantially real time video of at least one physical object;
    causing detection of a selection event on a display showing the substantially real time video of the at least one physical object; and
    in response to the detection of the selection event, causing display of a pre-recorded image of a second scene recorded at a second position, wherein the at least one physical object is between the first position and the second position, and wherein the pre-recorded image of the second scene recorded at the second position is determined based on the first position and the first orientation.

12. A method as claimed in claim 11, wherein the second position is constrained by the first position and the at least one physical object such that the at least one physical object is between the first position and the second position.

13. A method as claimed in claim 11, wherein the substantially real time video of the first scene is captured from a first orientation and the image of the second scene is recorded at a second orientation and the second orientation is constrained by the first orientation.

14. A method as claimed in claim 13, wherein the first orientation defines a heading that passes through the at least one physical object and the second position is a point along the heading or a point sufficiently close to a point along the heading such that the at least one physical object lies between the first position and the second position.

15. A method as claimed in claim 11, wherein the selection event comprises a gesture.

16. A method as claimed in claim 15, wherein the gesture comprises a moving gesture.

17. A method as claimed in claim 11, wherein the method further comprises, in response to a change in an orientation of an apparatus, causing a panning move in the pre-recorded image.

18. A computer program product comprising a non-transitory computer readable medium that stores a computer program that, when run on a computer, enables performance of:
    causing display of an image of a first scene at a first position captured from a first orientation, the first scene comprising a substantially real time video of at least one physical object;
    causing detection of a selection event on a display showing the substantially real time video of the at least one physical object; and in response to the detection of the selection event, causing display of a pre-recorded image of a second scene recorded at a second position, wherein the at least one physical object is between the first position and the second position, and wherein the pre-recorded image of the second scene recorded at the second position is determined based on the first position and the first orientation.

* * * * *